June 27, 1967 R. J. WOLF, JR 3,328,653

THIN FILM PRESSURE TRANSDUCER

Original Filed Feb. 26, 1965 2 Sheets-Sheet 1

INVENTOR
RUDOLPH J. WOLF, JR.

BY William R. Nolte
AGENT

June 27, 1967  R. J. WOLF, JR  3,328,653
THIN FILM PRESSURE TRANSDUCER
Original Filed Feb. 26, 1965  2 Sheets-Sheet 2

INVENTOR
RUDOLPH J. WOLF, JR.
BY
William R. Nolte
AGENT

United States Patent Office 3,328,653
Patented June 27, 1967

3,328,653
THIN FILM PRESSURE TRANSDUCER
Rudolph J. Wolf, Jr., Worcester, Pa., assignor to The Budd Company, Philadelphia, Pa., a corporation of Pennsylvania
Continuation of application Ser. No. 435,595, Feb. 26, 1965. This application Sept. 22, 1966, Ser. No. 581,394
2 Claims. (Cl. 317—246)

ABSTRACT OF THE DISCLOSURE

A variable capacitor type transducer includes a thin movable element as one electrode of the capacitor and a fixed electrode including a plurality of concentric closely spaced grooves. The movable element is secured to a flexible diaphragm and the fixed electrode is secured to a rigid fixed dielectric base.

---

This invention relates to pressure transducers, and more particularly to thin film pressure transducers for measuring high frequency pressure fluctuations.

This is a continuation of application Ser. No. 435,595, filed Feb. 26, 1965, now abandoned.

Heretofore, in the field of gas turbine testing, pressure responsive units of the capacitive type have been employed in the acquisition of dynamic pressure information. Such units have been employed to ascertain the frequency and magnitude of pressure fluctuations relative to the flow of hot gasses over turbine test specimens. The physical dimensions or sizes of such units however, have had an overall thickness dimension such when applied to the test specimen that it resulted in significant disturbances or otherwise affected the air stream flow over the specimens thereby resulting in the inability to properly and adequately measure the desired high frequency-pressure fluctuations. These units have moreover been found to be unsatisfactory in other respects, in that their repeatability on sensitivity and response from unit to unit has been poor due to the surface characteristics of the fixed electrodes of such units.

It is an object of this invention therefore to provide an improved frequency-pressure responsive unit which avoids one or more of the disadvantages of the prior art arrangements and which has an improved sensitivity.

It is a further object of this invention to provide a frequency-pressure responsive unit which is operable over a relatively wide pressure range and which is of relatively high sensitivity.

In accordance with the invention, a dynamic pressure transducer assembly for measuring high frequency pressure fluctuations comprises a fixed electrode sandwiched between a very thin flexible, upper layer of dielectric material and a rigid base layer of dielectric material. The upper layer of dielectric material carries a very thin film of deposited metal opposite the fixed electrode which constitutes a movable electrode. The top surface of the fixed electrode includes a multiplicity of uniformly shaped cavities into which the upper movable film is incrementally deflected. The cavities within the fixed electrode are uniformly reproducible, and have width and depth dimensions which correspond to the deformation characteristics of the upper dielectric layer when subjected to a given range of pressures and temperatures. Such changes in pressure cause the distance of the movable electrode from the fixed electrode to vary and thus change the capacitance of the transducer assembly.

For a better understanding of the present invention, together with other and further objects thereof, reference is had to the following description taken in connection with the accompanying drawing and its scope which will be pointed out in the appended claims.

Figure 1:
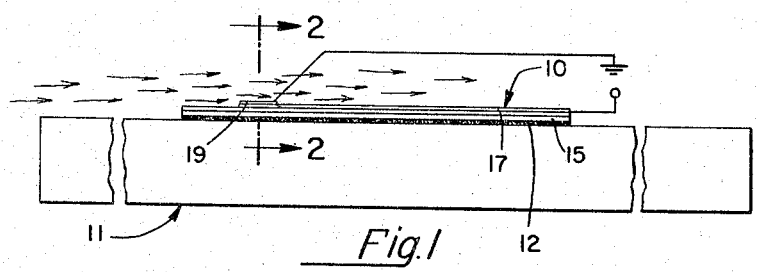
FIG. 1 shows the pressure transducer of the invention applied to a test specimen such as a turbine blade.

Referring now to FIG. 1 of the drawing, there is shown a thin film pressure transducer assembly 10 secured to a test specimen such as a gas turbine blade 11. The transducer assembly is of a generally flattened form and may be secured to a surface of the turbine blade with a suitable adhesive 12. The height from which the assembly projects above the turbine blade surface is slight and therefore does not unduly project into the air stream. As the hot gasses between 550° F. and 1000° F. flow over the blade a pressure is created on the disc assembly which, in turn, changes its capacitance.

Figure 2:
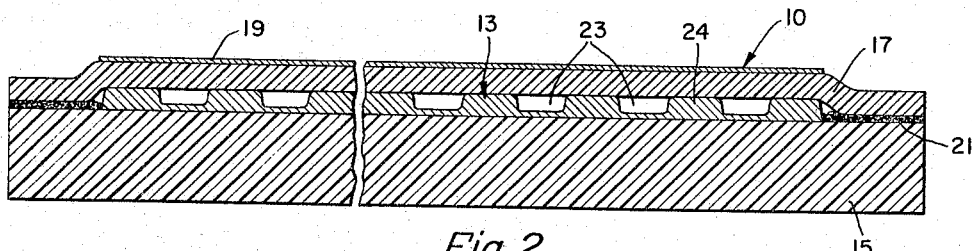
FIG. 2 is an enlarged vertical sectional view taken along the line 2—2 of FIG. 1.
Figure 9:
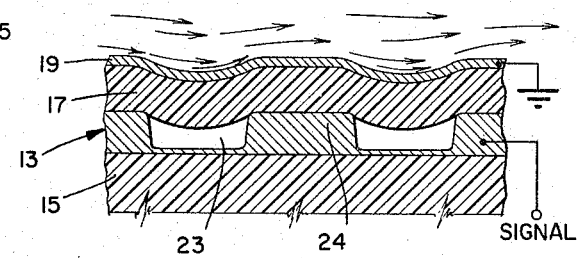
FIG. 9 is an enlarged view similar to FIG. 8 showing the movable electrode in its flexed relationship greatly exaggerated.
Figure 7:
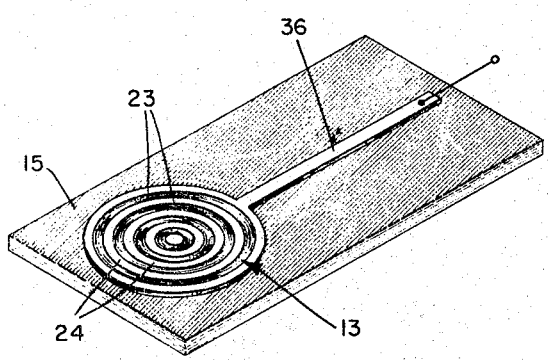
FIG. 7 illustrates the base electrode after an acid etching operation subsequent to the masking operation illustrated in FIG. 6.

With reference to FIG. 2, it is seen that the transducer assembly 10 consists of a base or fixed electrode 13 sandwiched between a lower dielectric base member 15 and a very thin upper dielectric layer 17. The upper surface of the latter layer carries a movable electrode 19 which may consist of a vacuum deposited thin film layer of metal such as aluminum. Dielectric layer 17, which may be less than .0005 inch thick, is extremely flexible, and is secured along its lower marginal edges to the top surface of the base dielectric member 15 by means of a suitable adhesive 21. The layer 17 is unbonded over the top surface of the base electrode. The base electrode 13 includes a plurality of uniform cavities 23, which in combination with the unbonded portion of the upper dielectric layer 17, entrap air therebetween. As better seen in FIG. 9 with changes in pressure due to the flow of hot gasses over the top of the transducer 10, the movable vacuum deposited electrode 19 carried on layer 17 can be deflected toward the openings of the cavities to compress the air within. When the pressure of the hot gasses is relieved the pressure of the entrapped air taken with the elasticity of the top dielectric layer 17 is effective to restore the top electrode 19 to its initial undeflected state.

Figure 3:
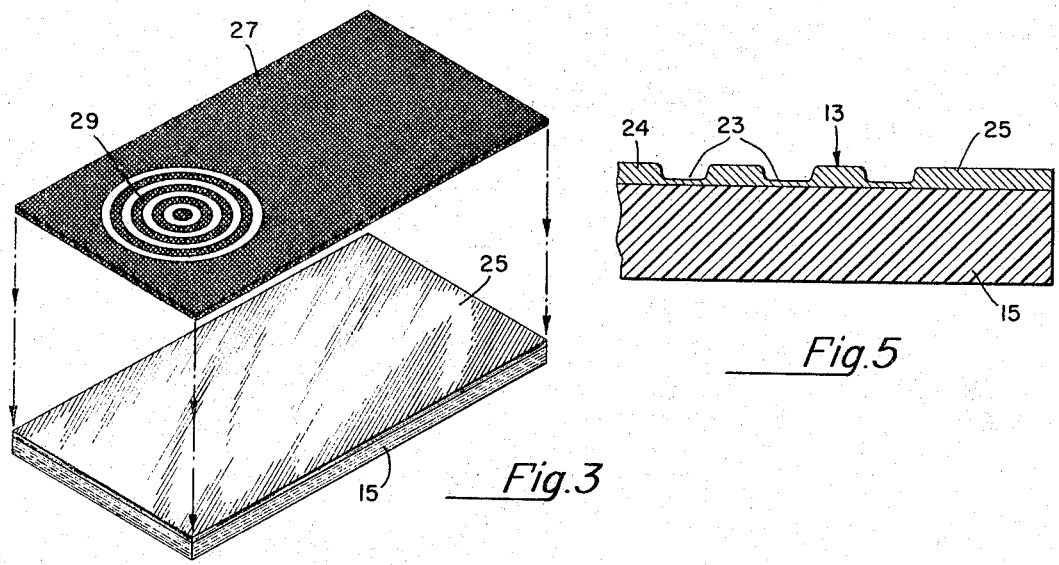
FIG. 3 is a perspective view illustrating an initial masking operation prior to the preliminary etching step in the formation of the base electrode of the transducer.
Figure 5:
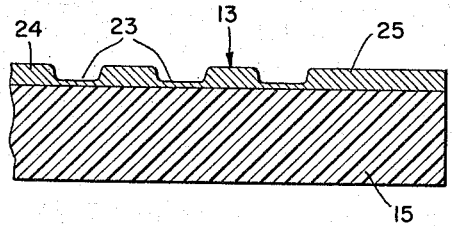
FIG. 5 is a sectional view taken along the line 5—5 of FIG. 4.
Figure 4:
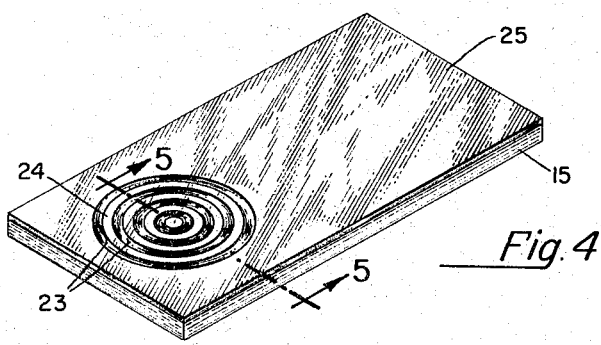
FIG. 4 shows a perspective view of the partially etched base electrode.
Figure 6:
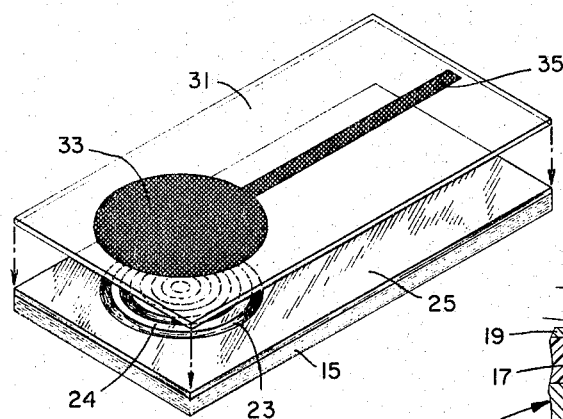
FIG. 6 is a perspective view illustrating another masking operation connected with the formation of the base electrode.

It has been found of great importance from the standpoint of achieving repeatability on sensitivity and response from one transducer assembly to the next that the cavities 23 of the base electrode be uniform in dimension and closely spaced one to another. We have found that such a unit having a uniformly reproducible pattern of cavities in a base electrode may be fabricated in the following manner. With reference to FIG. 3, a very thin strip of metal foil 25 which may be of the order of 150 micro inches thick is applied to the previously referred to base dielectric layer 15. This layer 15 may be a fiber glass reinforced epoxy which is applied in liquid form and caused to adhere to the lower surface of the metal foil 25. The top surface of the metal foil may thereafter be suitably photosensitized over its entire surface with a photoresist material. Using a negative 27 having a pattern 29 of concentric circles of predetermined line and space width, which may be of the order of .0005 inch, the photoresist surface of the foil may be suitably exposed. The foil containing the pattern is then photographically developed to produce an etch-resist coating of the desired pattern. The foil 25 is thereafter control-etched by using an appropriate etchant so that its top surface is partially eaten away to a selected or predetermined depth to form a series of annular grooves or cavities 23 as indicated previously. As best seen in FIG. 5, the above etching process is allowed to proceed through a major portion of the thickness of the metal foil without penetrating through to the base dielectric layer 15. The etch-resist material is then removed and the entire top surface of the film including the grooves 23 and ridges 24 is again photographically sensitized and exposed to a second negative 31 as seen in FIG. 6. This negative includes a circular opaque disc portion 33 and an integral lead portion 35 extending radially therefrom. The remainder of the negative is clear to admit the passage of light therethrough. As shown, the circular disc-like portion 33 of the image is superimposed over the previous partially etched circular area made up of the annular ridges and grooves 23, 24 and the sensitized metal film 25 is exposed. After photographically developing this pattern, the metal film is etched once again. This removes all of the metal from the epoxy backing layer 15 except that contained within the circular outline of the fixed electrode 13 and the integral lead conductor 36.

Figure 8:
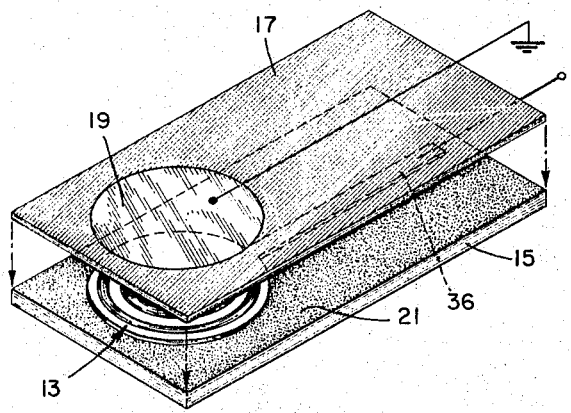
FIG. 8 is a perspective view illustrating the positioning of the movable electrode and its supporting dielectric layer relative to the base electrode prior to joining the same with adhesive.

Referring now to FIG. 8 the upper movable electrode or diaphragm portion of the assembly is aligned and secured to the base electrode portion by applying adhesive 21, previously referred to, to the top surface of the base 15 taking great care to avoid applying the same to the circular disc portion 13 of the fixed electrode. The marginal edges of the insulating or dielectric film 17, with the circular area 19 of vacuum deposited aluminum on its upper surface are pressed in contact with the adhesive. In this manner, the deposited film of metal 19 is free to flex relative to the fixed electrode therebeneath. In view of the extreme flexibility of the upper dielectric layer 17 and the thinness of the vacuum deposited aluminum foil 19, of the order of a few millionths of an inch, the diaphragm or movable electrode 19 is highly sensitive to changes in pressure due to the flow of gasses thereover.

Aside from the flexibility of layer 17 and foil 19 the response characteristics of the transducer assembly are also affected by the geometry of the cavities in the fixed electrode. It can be appreciated that, the size of the grooves 23 affects the frequency response and the sensitivity of the transducer. The frequency response is inversely affected by the width of the grooves 23; i.e., the open distance between adjacent ridges 24. The sensitivity, however, is directly affected by the width of the groove and the depth of said grooves. To achieve high frequency response a narrow width groove is desirable, thus a lower fixed electrode having a multiplicity of cavities very closely spaced one to another would be selected. If, therefore, a narrow groove width is selected for high frequency response and it is also desired at the same time to achieve maximum sensitivity then the grooves should be formed as deep as possible without going through the foil 25. From the above, it can be readily seen that the dimensions of the annular pattern can be selected to achieve a transducer assembly of desired response and sensitivity.

Figure 11:
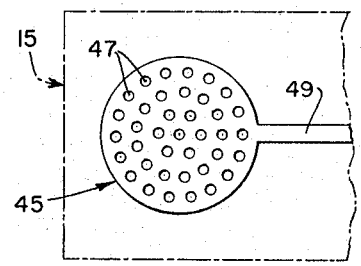
FIG. 11 illustrates a further modified form of the base electrode of the transducer.
Figure 10:
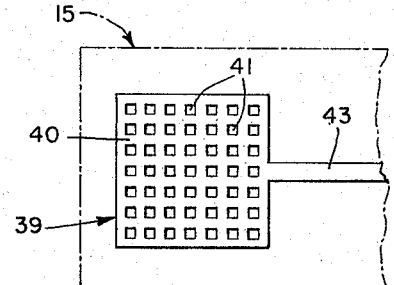
FIG. 10 is a modified form of a fixed electrode showing a coordinate grid of rectangular cavities.

Modifications of the form of the fixed electrode 13 and embodying this invention are shown in FIGURES 10 and 11. Referring first to FIG. 10, the fixed electrode 39 is of a waffle iron configuration and as above described with respect to fixed electrode 13 is likewise mounted upon a rigid dielectric base 15. The electrode includes a rectangular area 40 having a coordinate grid of cavities 41. The cavities are of generally uniform cross-section and are of a depth less than the thickness of the electrode. An elongated portion 43 extends from one end of the area and constitutes an integral lead for the electrode. The rows and columns of cavities 41 may be formed therein by application of a suitable resist-pattern to a sheet of foil 25 mounted on a suitable dielectric base layer 15 of FIG. 3 and thereafter partially etching the same in the manner set out above. Thereafter the final resist-pattern having a suitable elongated portion corresponding to the integral lead may be applied and subsequently etched to the desired finished form.

Referring now to FIG. 11 there is shown a further configuration of a circular base electrode 45 which includes an array of cavities 47 having circular openings and an integral lead 49. This configuration may likewise be formed in the manner as set out above.

While the above described various configurations of cavities have been formed by etching techniques, it is to be understood that other methods may be employed to obtain uniform reproducible controlled patterns. Thus it is apparent that equivalent techniques may be utilized to obtain a reproducible surface roughness. The principal requirement desired in the selected technique is that it produce a maximum number of cavities resulting in a maximum volume of air entrapment, and that the open distance at the mouth of each cavity be a minimum, taking care that the depth of such cavities be not so great as to extend through to the base dielectric.

While there have been described what are at present considered to be the preferred embodiments of this invention, it will be obvious to those skilled in the art that various changes and modifications may be made therein without departing from the invention, and it is aimed in the appended claims to cover all such changes and modifications as fall within the true spirit and scope of the invention.

What is claimed is:

1. In a thin film pressure transducer assembly of the capacitance type for measuring high frequency pressure fluctuations, the combination comprising, a rigid dielectric base, a fixed planar electrode having one of its surfaces affixed to the top surface of said base, said fixed electrode having a great multiplicity of annular concentric cavities depending from its opposite surface, said concentric cavities being of a predetermined line and space width in the order of .0005 inch, a thin flexible dielectric layer having a thickness of less than .0005 inch covering said fixed electrode and said layer being secured along its inner surface marginal edge portions to the top surface of said rigid dielectric base to entrap air within said cavities, a vacuum deposited thin film having a thickness of less than .00015 inch aligned in opposed relation with said fixed electrode and secured on the outer surface of said flexible dielectric layer, whereby changes in pressure on said thin film electrode cause portions of the same and contiguous portions of said flexible dielectric layer to be moved normal to the openings in said cavities to change the capacitance of the transducer.

2. The invention as set forth in claim 1 wherein said fixed electrode further has an elongated extension integral therewith and constituting an electrical lead.

References Cited

UNITED STATES PATENTS 2,576,489  11/1951  Stovall _____ 317—246
2,866,141  12/1958  Frank _____ 317—246

OTHER REFERENCES

Kuhl, W., et al.: Condenser Transmitters and Microphones With Solid Dielectric for Airbore Ultrasonics in Acustica, vol. 4, No. 5, 1954, pp. 519–532.

LEWIS H. MYERS, *Primary Examiner.*

E. GOLDBERG, *Assistant Examiner.*